J. P. Beatty's Improvement in Hats.

4277

REISSUED FEB 28 1871

Witnesses,

Wm. J. Lett

Joseph Campbell

J. P. Beatty

Inventor by T. C. Threadwell Jun. atty.

UNITED STATES PATENT OFFICE.

JOHN P. BEATTY, OF NORWALK, CONNECTICUT.

IMPROVEMENT IN HATS.

Specification forming part of Letters Patent No. 88,116, dated March 23, 1869; antedated February 2, 1869; Reissue No. 3,855, dated March 1, 1870; Reissue No. 4,277, dated February 28, 1871.

*To all whom it may concern:*

Be it known that I, JOHN P. BEATTY, of Norwalk, in the county of Fairfield and State of Connecticut, have invented certain new and useful Improvements in Ventilators for Hats; and I do hereby declare that the following is a full, clear, and exact description thereof, reference being had to the accompanying drawings, making part of this specification, and to the letters of reference marked thereon, like letters indicating like parts wherever they occur My invention relates to ventilators for hats; and it consists, first, in constructing the hat-ventilator of a flat corrugated wire or narrow strip of metal; also, in attaching the ventilator to the lower edge of the sweat, the combined ventilator and sweat constituting an article of manufacture to be sold to hatters; also, in combining the corrugated wire ventilator with the sweat and body of the hat, substantially as hereinafter described.

Figure 1:
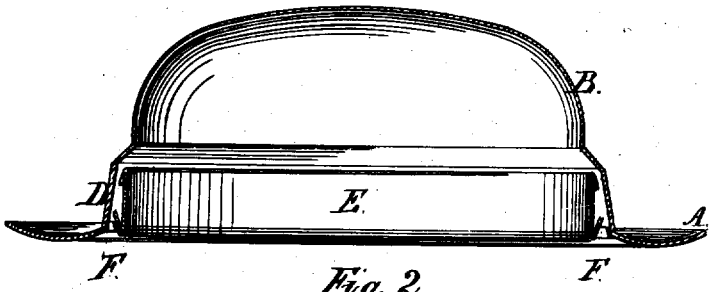
Figure 2:
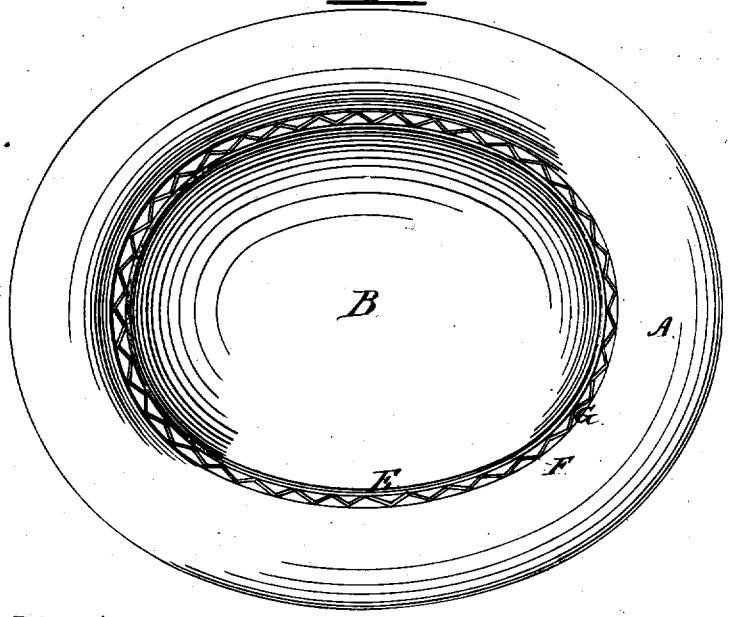
Figure 4:
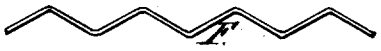
Figure 6:
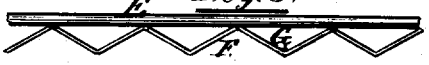
Figure 5:
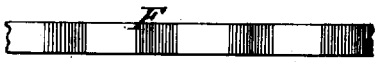

Figure 1 is a vertical section of a hat with my improvement applied thereto. Fig. 2 is a plan view looking into the interior of the hat. Fig. 4 is an edge view, and Fig. 5 a side view, of the corrugated strip shown detached and enlarged; and Figs. 5 and 6 are similar views, showing the strip attached to a leather or sweat.

Figure 7:
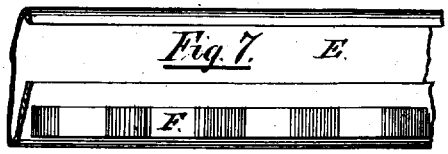
Figure 3:
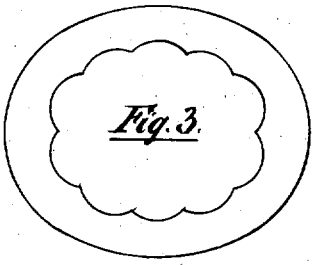

In constructing my improved device, I take a narrow strip of metal—preferably a wire made flat by passing it between rolls, the same as in producing hoops for skirts—and cover it with fibrous material, preferably by braiding or weaving thereon thread in any suitable manner; or the covered wire used for the manufacture of hoop-skirts may be used for the purpose. This strip or wire I then corrugate or crimp transversely, as represented in Fig. 4. Having thus prepared the wire, I then sew it fast to the outside of the leather or sweat E, as represented in Figs. 6 and 7, the fibrous covering serving as a means for readily sewing the two together. When thus united, the two are placed within the hat and secured there by sewing the wire F to the hat, as represented in Figs. 1 and 2. When thus arranged, it will be seen that the corrugations of the wire F form a series of spaces, G, for the passage of air between the leather or sweat E and the sides of the crown B of the hat. At the same time the leather or sweat E being secured to the wire or strip only at its lower edge, the body of the leather above the wire or ventilator F is left free and pliable, and consequently the upper part of the leather is free to conform to the head of the wearer, thus causing the hat to sit light and easy on the head. It is also obvious that the fibrous covering may be dispensed with and the thread passed around the wire in sewing it to the leather and to the hat, but it is neither as convenient nor as neat as when used with the fibrous covering.

In many cases it is desirable to furnish hatters and the trade generally with my ventilator without having it secured to the hat, in order to enable them to apply it to hats of their own construction. In those cases where they prefer to furnish their own leathers or sweats also, I simply provide them with the ventilator F itself, but usually I first attach it to the leather or sweat E as represented in Figs. 6 and 7 and sell them in that condition. In either case the ventilator thus becomes an article of manufacture, and as such is furnished to the trade.

The ventilator thus made is appliable to hats of all styles and kinds, and it is exceedingly efficient, light, and cheap, and dispenses entirely with the various forms of metal plates heretofore used for a similar purpose, at the same time causing the hat to fit easier on the head.

Having thus described my invention, what I claim is--

1. A ventilator for hats, consisting of corrugated or crimped wire, substantially as described.

2. The ventilator or corrugated wire F when attached to the leather or sweat E, as a new article of manufacture.

3. A hat having its sweat secured in place by a wire arranged and attached in a zigzag form between its lower edge and the body of the hat, and so as to leave its upper edge loose, substantially as herein shown and described.

JOHN P. BEATTY.

Witnesses:

E. V. A. CHICHESTER,

EDWD. P. WEED.